(12) United States Patent
Mattar

(10) Patent No.: US 11,120,454 B2
(45) Date of Patent: Sep. 14, 2021

(54) INDUSTRIAL INTERNET OF THINGS (IIOT) METHOD FOR CUSTOMER ALERTS PERTAINING TO INSTRUMENTATION

(71) Applicant: Schneider Electric Systems USA, Inc., Foxboro, MA (US)

(72) Inventor: Wade M. Mattar, Wrentham, MA (US)

(73) Assignee: Schneider Electric Systems USA, Inc., Foxboro, MA (US)

(*) Notice: Subject to any disclaimer, the term of this patent is extended or adjusted under 35 U.S.C. 154(b) by 153 days.

(21) Appl. No.: 16/366,026

(22) Filed: Mar. 27, 2019

(65) Prior Publication Data

US 2020/0311737 A1  Oct. 1, 2020

(51) Int. Cl.
*G06Q 30/00* (2012.01)
*G06Q 10/10* (2012.01)

(52) U.S. Cl.
CPC ......... *G06Q 30/014* (2013.01); *G06Q 10/107* (2013.01)

(58) Field of Classification Search
CPC .......................... G06Q 30/014; G06Q 10/107
See application file for complete search history.

(56) References Cited

U.S. PATENT DOCUMENTS 5,790,977 A    8/1998  Ezekiel
6,389,464 B1   5/2002  Krishnamurthy

FOREIGN PATENT DOCUMENTS

| WO | 2004006070 A2 | 1/2004 | |
| WO | 2012148400 A1 | 11/2012 | |
| WO | WO-2012148400 A1 * | 11/2012 | ............... G06F 8/65 |
| WO | 2017016911 A1 | 2/2017 | |
| WO | WO-2017016911 A1 * | 2/2017 | ........... G06Q 30/014 |
| WO | 2020142250 A1 | 7/2020 | |

OTHER PUBLICATIONS

Extended European Searh Report dated Aug. 14, 2020 for EP Application No. 20162960.7-1218.

* cited by examiner

*Primary Examiner* — Garcia Ade
(74) *Attorney, Agent, or Firm* — Locke Lord LLP

(57) ABSTRACT

Techniques for notification concerning recall or notification of non-conformance of an industrial instrument product are provided. A module associated with the instrument communicates with the vendor of the instrument over a wide-area communications link or internet link. When the module receives an alert notice from the vendor pertaining to recall or non-conformance of the instrument, the module transmits the alert information to the customer or an associate of the customer having a responsibility for the instrument. The module may also cause the alert information and diagnostic, maintenance, or update information to be displayed on a display device of the instrument.

24 Claims, 8 Drawing Sheets

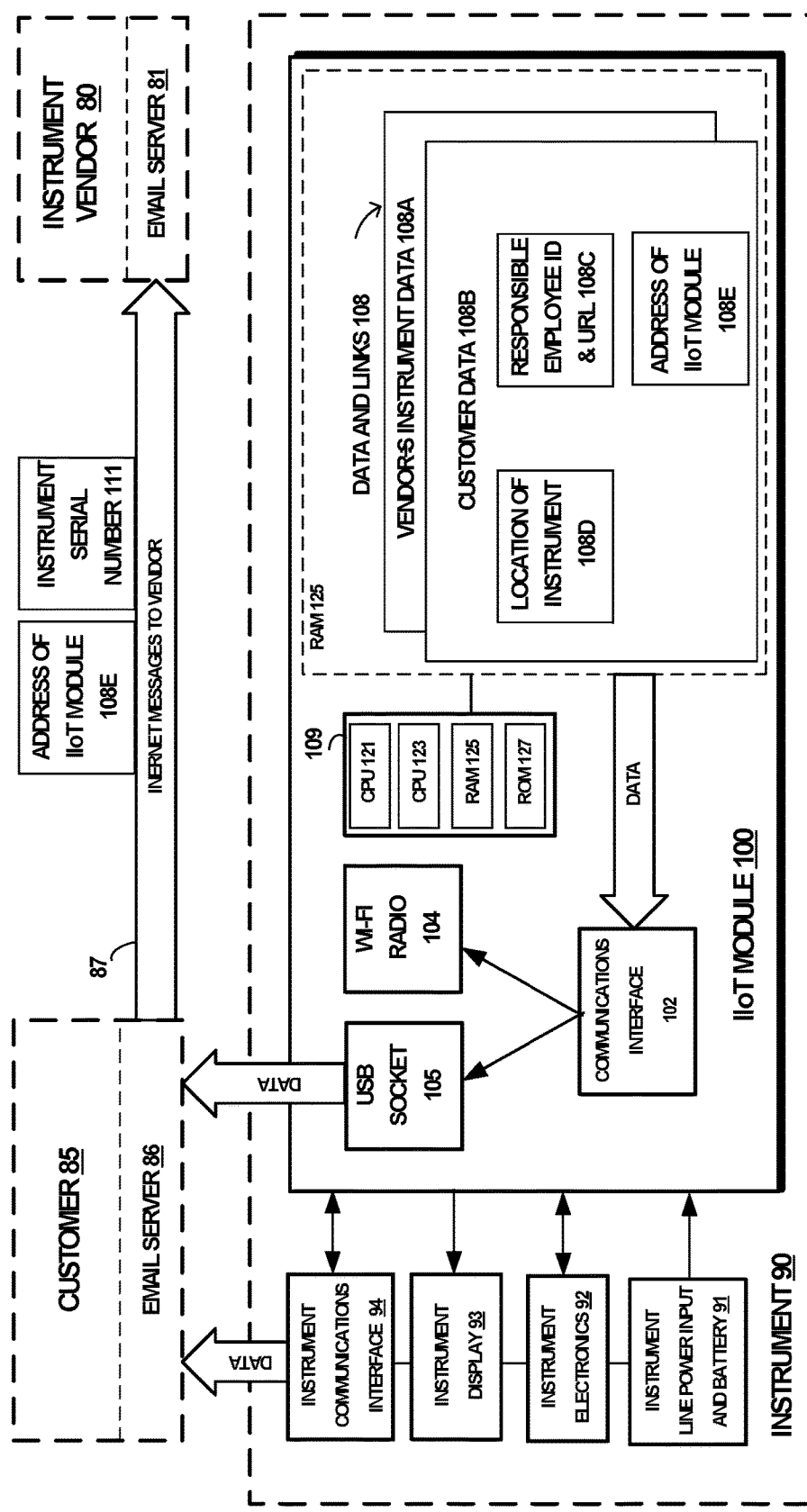

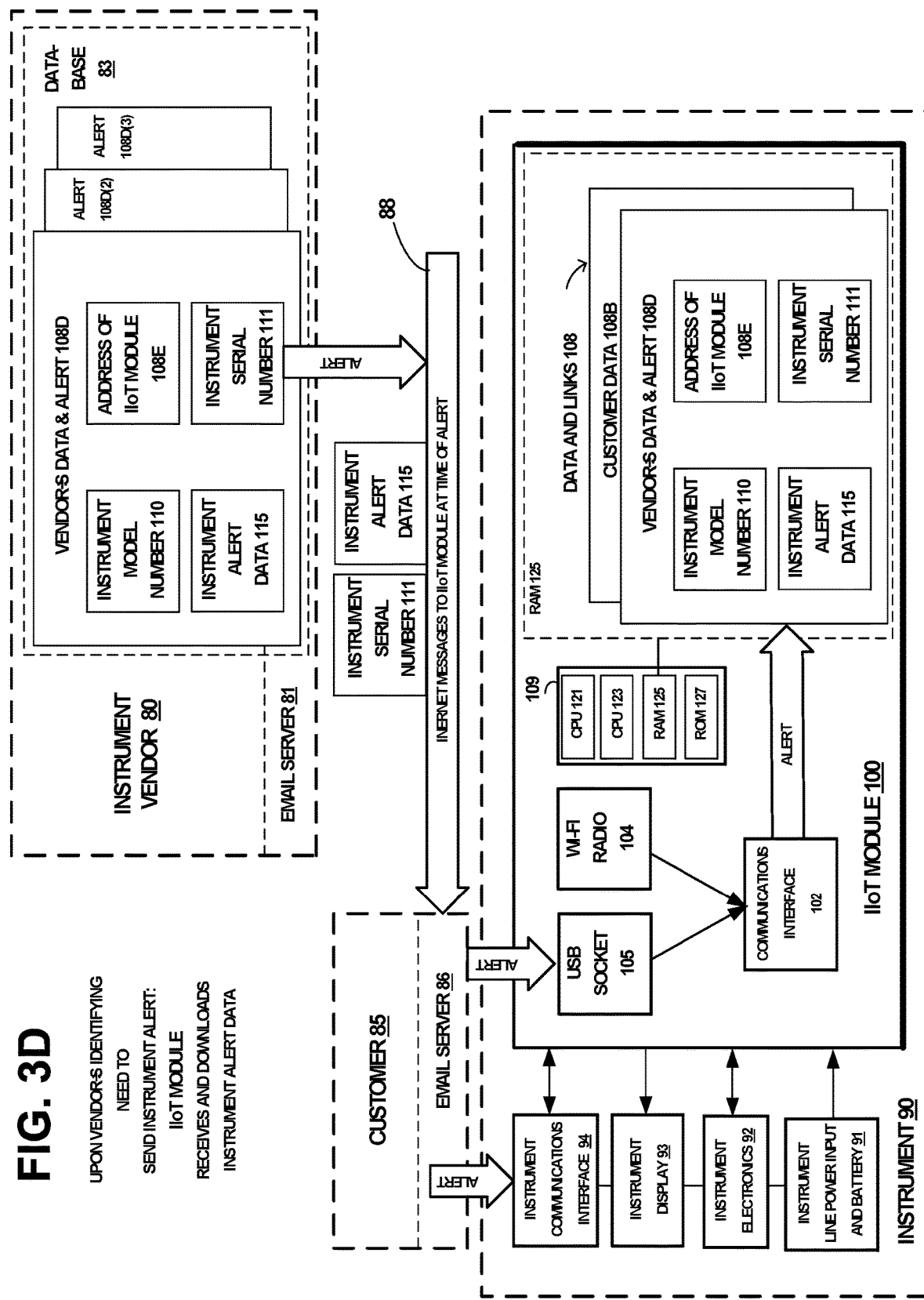

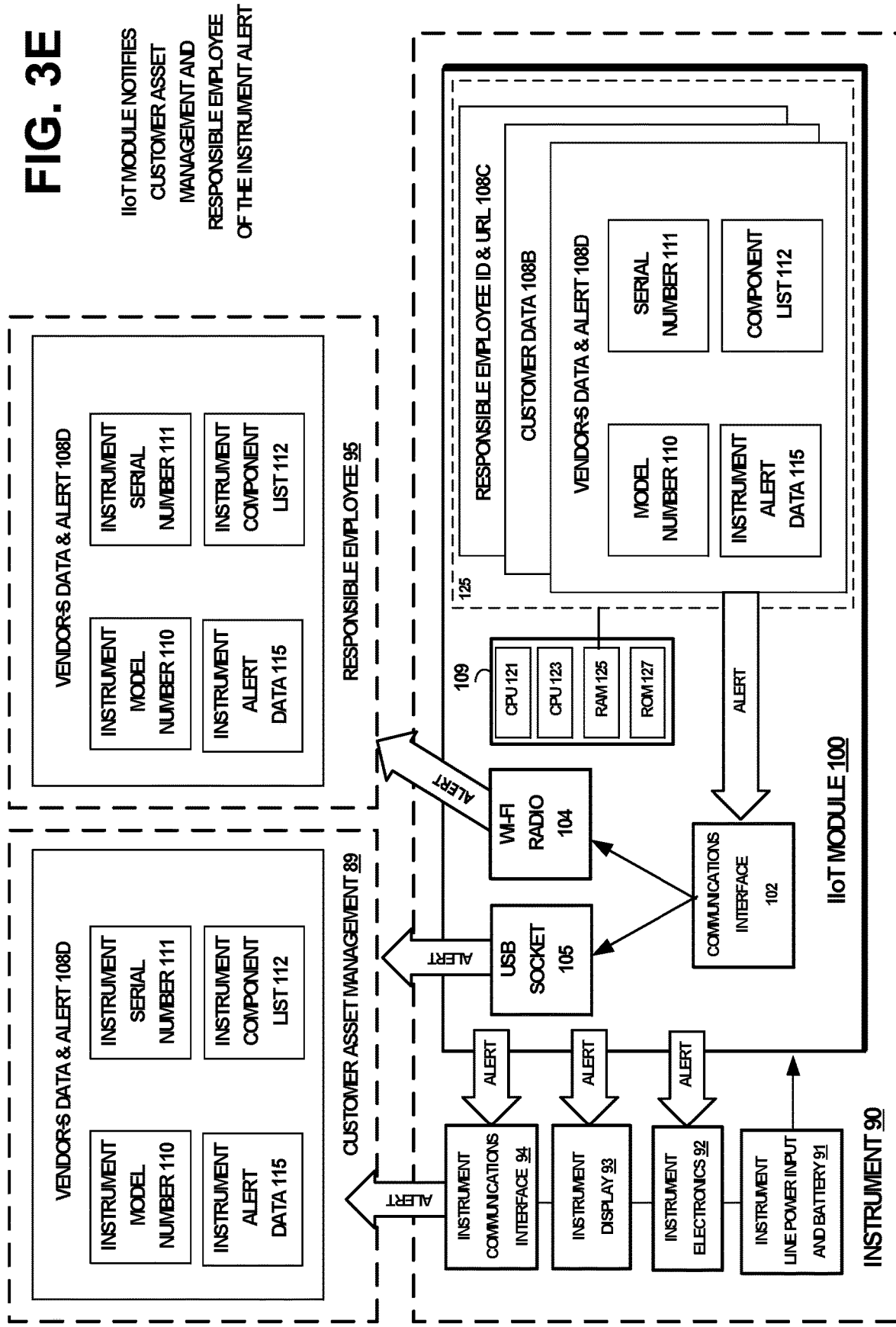

202 — receiving, by a module, from a vendor of an instrument, an identifier of the instrument with which the module is associated and a communications address of the vendor over a wide-area communications link or internet link;

↓

204 — receiving, by the module, from a customer of the vendor, a communications address to receive messages from the vendor over the wide-area communications link or internet link, and a communications address of an associate of the customer having a responsibility for the instrument;

↓

206 — transmitting, by the module, over the wide-area communications link or internet link to the vendor, the identifier of the instrument and the communications address to receive messages from the vendor over the wide-area communications link or internet link;

↓

208 — receiving, by the module, from the vendor, an alert notice pertaining to the instrument, via the communications address to receive messages from the vendor over the wide-area communications link or internet link; and

↓

210 — transmitting, by the module, to the communications address of the associate of the customer, information related to the alert notice pertaining to the instrument.

INDUSTRIAL INTERNET OF THINGS (IIOT) METHOD FOR CUSTOMER ALERTS PERTAINING TO INSTRUMENTATION

BACKGROUND

Technical Field

The present disclosure relates to notification to customers of product issues that require recall or notification of non-conformance and, more specifically, to using internet connectivity within a product to initiate a broadcast notification based on the serial number of affected product to trigger within the product an alert.

Description of the Related Art

Product issues identified by the manufacturer of the product may require recall or notification to customers of non-conformance. For industrial instrument products, often times a product issue that may be safety related requires the manufacturing company to send out notification letters by postal mail. It is not uncommon that these letters get returned as undeliverable, get thrown out or are forgotten. Many times the industrial instrument product in question was installed by customer personnel who are now retired. Sometimes the customer has no record of the location of the industrial instrument product. As a result, an industrial instrument product installed by a customer, which may have a product issue that may be safety related, remains unresolved.

SUMMARY

In accordance with one embodiment described herein, a method, apparatus and computer program product provide for notification concerning recall or notification of non-conformance of an industrial instrument product. A module associated with the instrument communicates with the vendor of the instrument over a wide-area communications link or internet link. When the module receives an alert notice from the vendor pertaining to recall or non-conformance of the instrument, the module transmits the alert information to the customer or an associate of the customer having a responsibility for the instrument. The alert information may include diagnostic, maintenance, update, recall or notification of non-conformance information pertaining to the instrument. The module may also cause the alert information to be displayed on a display device of the instrument.

An example method embodiment comprises:

receiving, by a module, from a vendor of an instrument, an identifier of the instrument with which the module is associated and a communications address of the vendor over a wide-area communications link or internet link;

receiving, by the module, from a customer of the vendor, a communications address to receive messages from the vendor over the wide-area communications link or internet link, and a communications address of the customer or an associate of the customer having a responsibility for the instrument;

transmitting, by the module, over the wide-area communications link or internet link to the vendor, the identifier of the instrument and the communications address to receive messages from the vendor over the wide-area communications link or internet link;

receiving, by the module, from the vendor, an alert notice pertaining to the instrument, via the communications address to receive messages from the vendor over the wide-area communications link or internet link; and transmitting, by the module, to the communications address of the customer or the associate of the customer, information related to the alert notice pertaining to the instrument.

DESCRIPTION OF THE FIGURES

Example embodiments are depicted in the accompanying drawings that are briefly described as follows:

FIG. 3C is an example functional block diagram of the IIoT module of FIG. 3B connected over the Internet to the vendor, the IIoT module transmitting the communications address of the IIoT module and the serial number of the instrument to the vendor.

FIG. 3D is an example functional block diagram of the IIoT module of FIG. 3C connected over the Internet to the vendor, the IIoT module receiving and downloading an alert notice sent from the vendor to the customer pertaining to product issues of the instrument that may require recall or notification of non-conformance.

FIG. 3E is an example functional block diagram of the IIoT module of FIG. 3D, forwarding the alert notice sent from the vendor to the customer, with copies of the alert notice sent to an employee of the customer who is responsible for the instrument and a copy to the customer's asset management entity.

FIG. 4 is a flow diagram of computer program code components which, when executed by operation of the processor in the IIoT module, performs operations of the IIoT module to enable the module to receive broadcast alert notices from the vendor over the Internet, pertaining to product issues of the instrument.

DETAILED DESCRIPTION

Industrial instruments include devices to monitor and control an industrial process, such as flow-rate sensors or pressure sensors, control devices such as motor speed controllers, and operator interfaces such as meters or displays. Such instruments are typically interconnected in networks in an industrial plant. For example, a flow-rate sensor for cooling water in a distillation tower of an oil refinery, may transmit measurement signals over an instrument communications network, to a motor controller that controls a pump motor pumping the cooling water whose flow-rate is being monitored. The motor controller, in turn, may transmit signals indicating the pump's power consumption, to an operator display. Each instrument comprises a complex arrangement of electrical and mechanical components, requiring periodic maintenance and updating as improvements become available. Occasionally, an industrial instrument product may develop a safety related issue that requires the manufacturing or vending company to issue an alert notice pertaining to recall or non-conformance of the instrument. Since there may be many industrial customers that have one or more of the same instrument in their plants, what is needed is to enable the manufacturer or vendor to initiate a broadcast notification based on a unique product identifier, such as the serial number, to all affected customers.

In accordance with one embodiment described herein, a method, apparatus and computer program product enable a manufacturer or vendor to broadcast notification to all affected customers, concerning recall or notification of non-conformance of an industrial instrument product.

Figure 1:
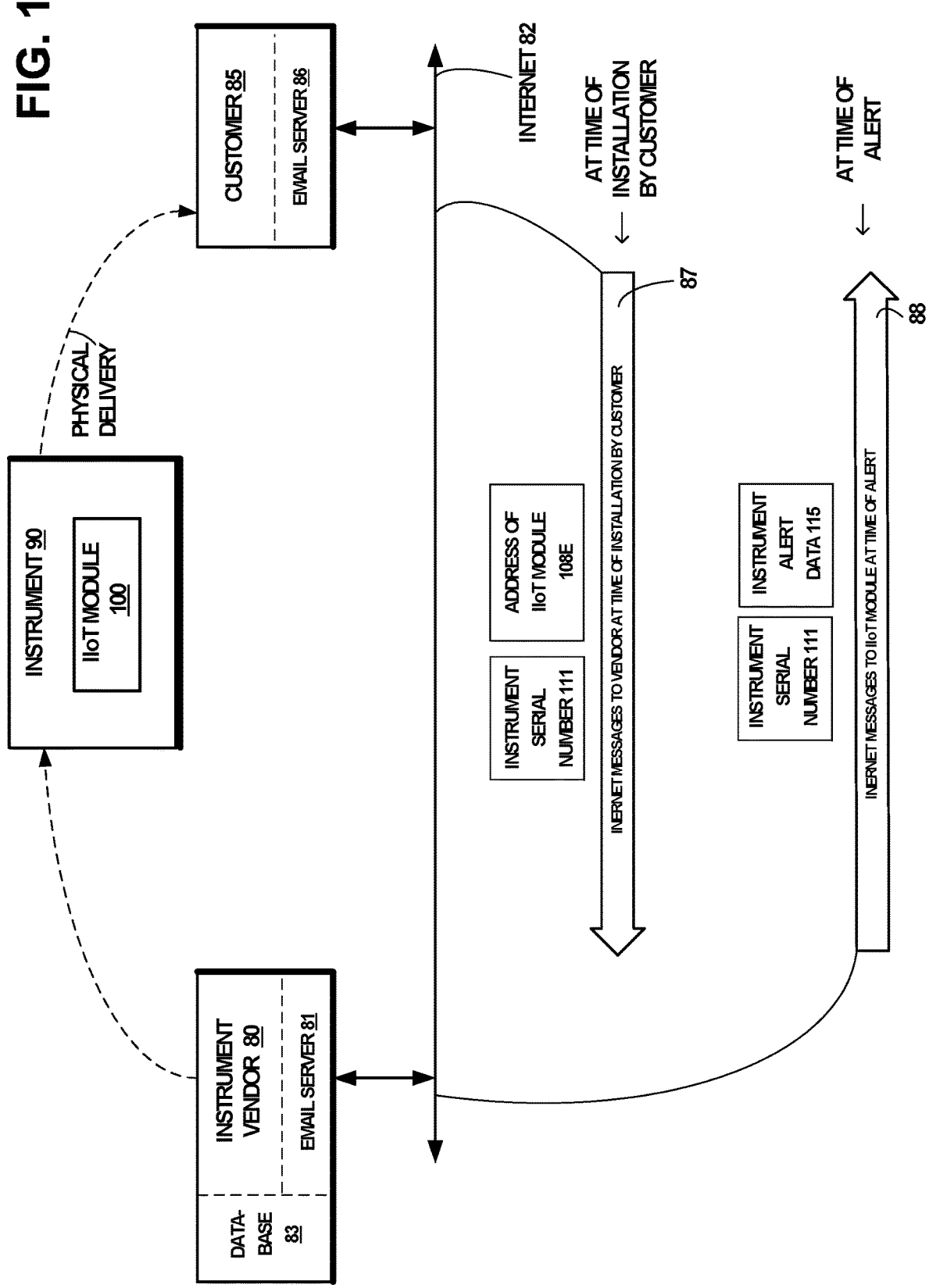
FIG. 1 is an example network diagram illustrating an industrial instrument vendor having shipped an industrial instrument to a customer, an instrument containing or associated with an Industrial Internet of Things (IIoT) module to enable the vendor to broadcast alert notices to the customer over the Internet pertaining to product issues of the instrument that may require recall or notification of non-conformance.

FIG. 1 is an example network diagram illustrating an industrial instrument vendor 80 having previously shipped an industrial instrument 90 to a customer 85. The vendor 80 may be a manufacturer of the instrument 90, a distributor of the instrument 90, or other type of custodian of the instrument 90. The instrument 90 contains or is associated with an Industrial Internet of Things (IIoT) module 100 to enable the vendor 80 to broadcast alert notices 88 to the customer over the Internet 82 pertaining to product issues of the instrument 90 that may require recall or notification of non-conformance.

At the time of manufacturing or vending by the vendor 80 of the instrument 90, the IIoT module 100 downloads the vendor's instrument data to the IIoT module 100 contained in or associated with the instrument 90. The IIoT module 100 may be mounted within the instrument 90, alternately it may be attached to the outside of the instrument 90, or alternately it may be otherwise associated with the instrument 90. The communications address of the vendor 80 is the email address of vendor 80 using the vendor's email server 81. An example of the vendor's email address may be "customer-service@vendor.com", using an email server 81 managed by the vendor 80 with the domain name "vendor.com". Alternately, the vendor 80 may use an online email service like Gmail or Yahoo Mail with a domain name "yahoo.com".

When the IIoT module 100 is located at the customer's 85 plant, at the time of the customer's installation of the instrument 90, the IIoT module 100 downloads to the IIoT module the customer's data and the communications address of the IIoT module 100. The communications address of the IIoT module 100 is the email address the customer assigns to the IIoT module 100 using the customer's email server 86. An example of the IIoT module's 100 email address may be "flow-rate-cooling-water-distillation-tower@customer.com", using an email server 86 managed by the customer 85 with the domain name "customer.com". Alternately, the IIoT module 100 may use an online email service like Gmail or Yahoo Mail with a domain name "gmail.com". The IIoT module 100 then transmits in an email message 87 to the vendor 80, the communications address assigned to the IIoT module 100 and the serial number of the instrument 90. Still another alternative is an email to the customer 85 that is redirected by the customer's email server 86 to the IIoT module 100, for example by reading the subject line of the email. For example, an email from the vendor 80 intended for the IIoT module 100 with an address of "customer-asset-management@customer.com" and a subject line of "Alert to flow-rate-cooling-water-distillation-tower", would be redirected by the customer's email server 86 to the IIoT module 100. These are examples of communications addresses to receive messages from the vendor 80 over the wide-area communications link or internet link. The IIoT module 100 may then communicate with the vendor 80 of the instrument 90 over the wide-area communications link or internet link 82 using email messages, when the IIoT module 100 is located at the customer's plant. The communications between the IIoT module 100 and the vendor 80 may be password protected or encrypted to enhance security of the communications.

The manufacturer or vendor 80 may determine that the instrument 90 may develop a safety related issue that requires issuing an alert notice in the form of the email 88 pertaining to recall or non-conformance of the instrument 90. The email 88 is sent to the IIoT module 100. When the IIoT module 100 receives the alert notice in the email 88 from the vendor 80, the IIoT module 100 downloads the notice. Then the IIoT module 100 transmits the alert information to the customer 85 or an associate of the customer having a responsibility for the instrument 90. The IIoT module 100 may also display the alert information and diagnostic, maintenance, or update information on a display device of the instrument 90.

The vendor's database 83 may have records of many industrial customers that have one or more of the same instrument 90 in their plants. The vendor 80 will repeat broadcasting the alert notice in emails similar to the email 88 to other IIoT modules 100 based on each respective product identifier or serial number, to all other affected customers.

Figure 2:
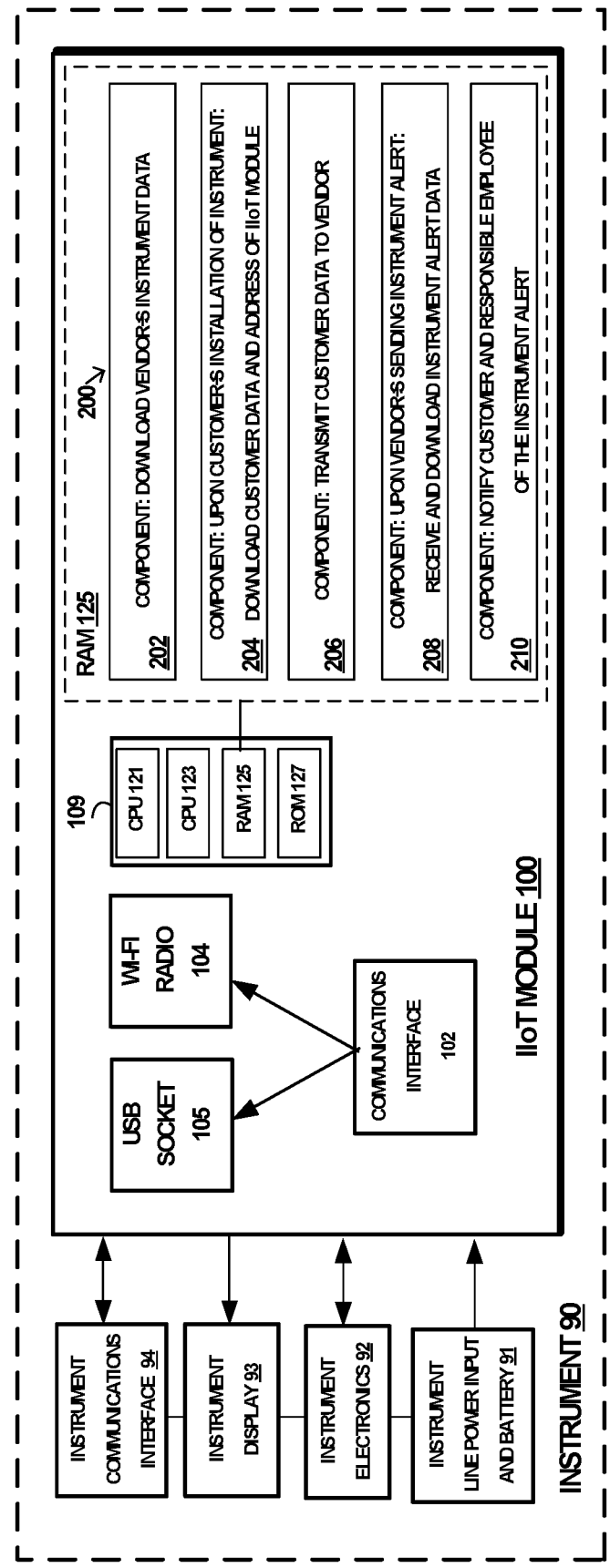
FIG. 2 is an example functional block diagram of the industrial instrument and the Industrial Internet of Things (IIoT) module that is associated with the instrument. The IIoT module may be mounted within the instrument, alternately it may be attached to the outside of the instrument, or alternately it may be otherwise associated with the instrument. The figure illustrates example components in the IIoT module, including a computer program stored in a memory, which carries out some of the operations of the IIoT module to enable the module to receive broadcast alert notices from the vendor over the Internet, pertaining to product issues of the instrument.

FIG. 2 is an example functional block diagram of the industrial instrument 90 and the Industrial Internet of Things (IIoT) module 100 that may be contained in or associated with the instrument 90. The example industrial instrument 90 manufactured or vended by the vendor 80, may comprise a complex arrangement of electrical and mechanical components, such as an instrument line power input and battery 91, instrument electronics 92, an instrument display, and an instrument communications interface 94. The IIoT module 100 may be mounted within the instrument 90, alternately it may be attached to the outside of the housing of the instrument 90, or alternately it may be otherwise associated with the instrument 90. The IIoT module 100 may be powered by the instrument line power input and battery 91 or it may have its own independent source of power.

The figure illustrates example components in the IIoT module 100, including a communications interface 102, a Wi-Fi radio 104, a USB socket 105, and a processor 109. The processor 109 may include at least one of the following: a dual or multi-core central processing unit CPU 121 and 123, a RAM memory 125, and a ROM memory 127. The RAM memory 125, and a ROM memory 127 may be removable storage media for storing data and/or computer program code as an example computer program product.

The RAM memory 125 in the IIoT module 100, shown within an expanded dotted area, includes computer program code components 200. The code components 200, when executed by operation at least one of the CPU 121 and/or 123 in the processor 109, performs operations of the IIoT module 100 to enable the module to receive broadcast alert notices from the vendor 80 over the Internet 82, pertaining to product issues of the instrument 90.

The code components 200 in the RAM memory 125 in the IIoT module 100 include at least the following:

Code component 202: DOWNLOAD VENDOR'S INSTRUMENT DATA.

Code component 204: UPON CUSTOMER'S INSTALLATION OF INSTRUMENT: DOWNLOAD CUSTOMER DATA AND ADDRESS OF IIoT MODULE.

Code component 206: TRANSMIT CUSTOMER DATA TO VENDOR.

Code component 208: UPON VENDOR'S SENDING INSTRUMENT ALERT: RECEIVE AND DOWNLOAD INSTRUMENT ALERT DATA.

Code component 210: NOTIFY CUSTOMER AND RESPONSIBLE EMPLOYEE OF THE INSTRUMENT ALERT.

Figure 3A:
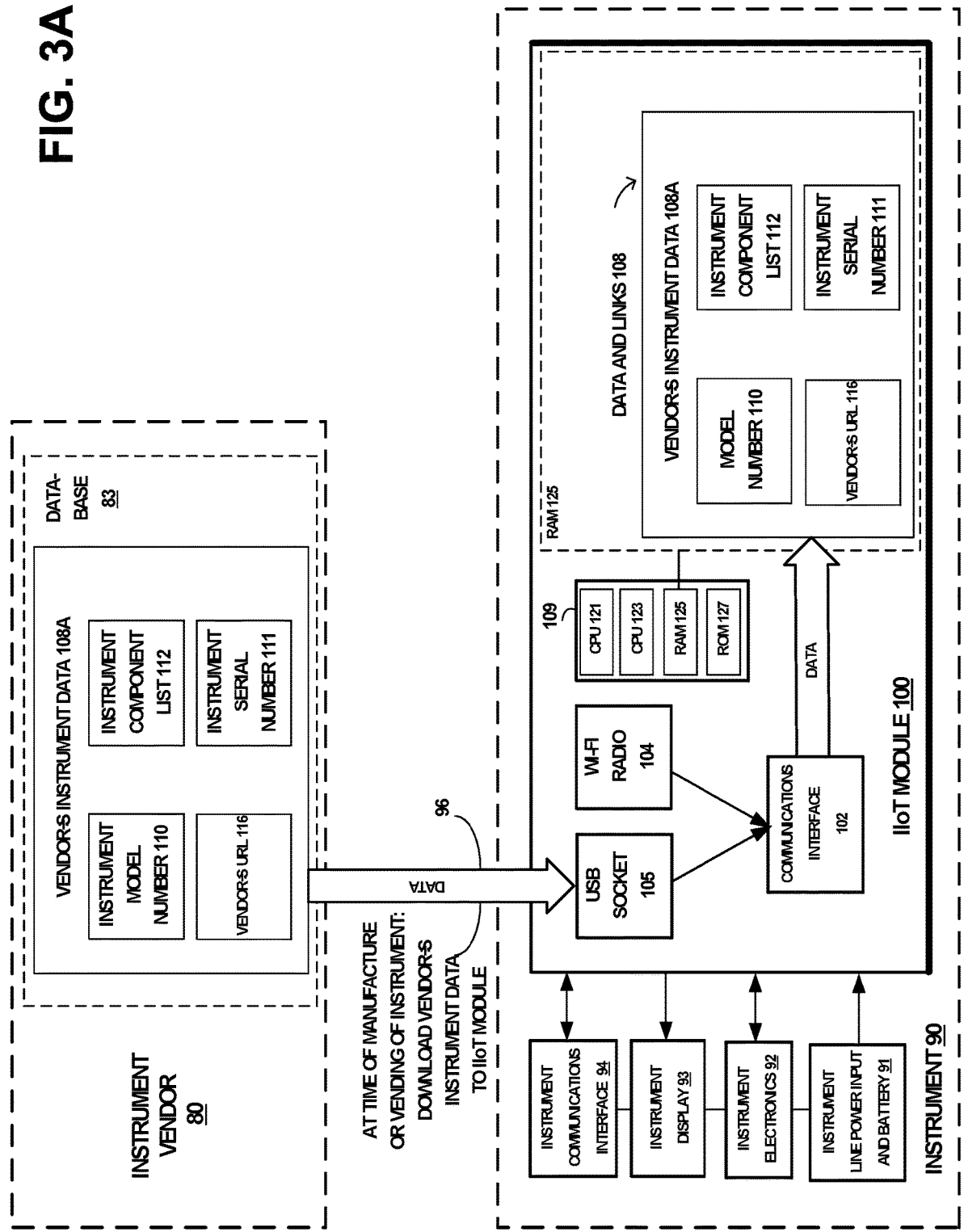
FIG. 3A is an example functional block diagram of the IIoT module of FIG. 2 connected to the instrument vendor at the time of manufacturing or vending the instrument, downloading the vendor's instrument data to the IIoT module.
Figure 3B:
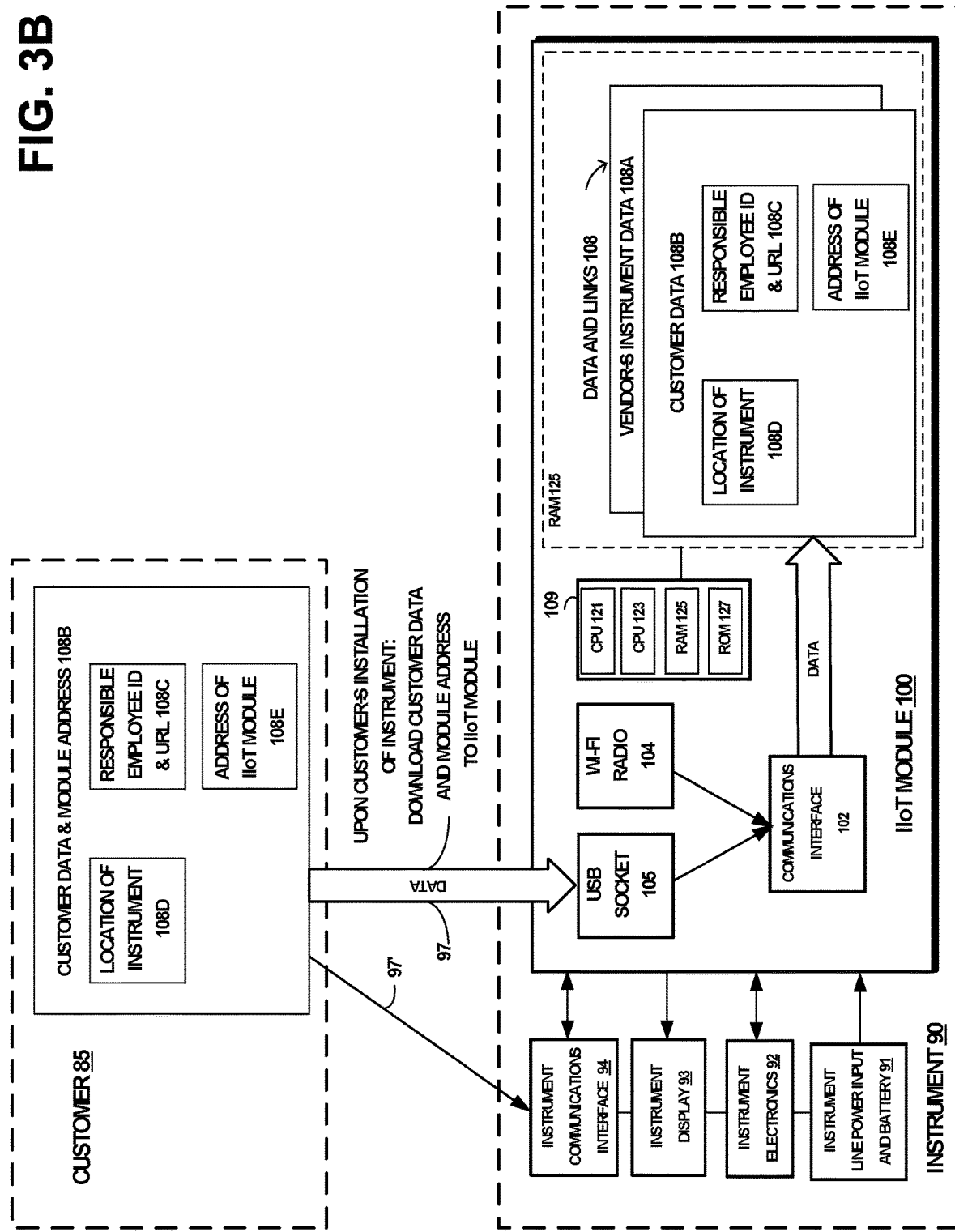
FIG. 3B is an example functional block diagram of the IIoT module of FIG. 3A connected to the customer at the time of the customer's installation of the instrument, downloading to the IIoT module the IIoT module the customer's data and the communications address of the IIoT module.

An example operation of code component 202 is illustrated in FIG. 3A. An example operation of code component 204 is illustrated in FIG. 3B. An example operation of code component 206 is illustrated in FIG. 3C. An example operation of code component 208 is illustrated in FIG. 3D. An example operation of code component 210 is illustrated in FIG. 3E. A more detailed illustration of the code components 200 is shown in the flow diagram of FIG. 4.

FIG. 3A is an example functional block diagram of the IIoT module 100 of FIG. 2 connected to the instrument vendor 80 at the time of manufacturing or vending the instrument 90, illustrating an example operation of code component 202, downloading the vendor's instrument data 108A from the database 83 to the IIoT module 100. The vendor's instrument data 108A may include the instrument model number 110, the instrument serial number 111, the instrument component list 112, the vendor's URL 116, and the communications address of the vendor 80, for example the email address of vendor 80 using the vendor's email server 81. An example of the vendor's email address may be "customer-service@vendor.com", using an email server 81 managed by the vendor 80 with the domain name "vendor.com". Alternately, the vendor 80 may use an online email service like Gmail or Yahoo Mail with a domain name "yahoo.com". The IIoT module 100 may receive at 96 the vendor's instrument data 108A via the USB socket 105 and communications interface 102 and store the data in the RAM memory 125 as data and links 108. Alternately, the vendor's instrument data 108A may be downloaded via the instrument communications interface 94 of the instrument 90 and transferred to the RAM memory 125 in the IIoT module 100.

FIG. 3B is an example functional block diagram of the IIoT module 100 of FIG. 3A connected to the customer 85 at the time of the customer's installation of the instrument 90, illustrating an example operation of code component 204, downloading to the IIoT module 100 the customer's data and the communications address 108B of the IIoT module 100. The customer's data and the communications address 108B may include the communications address 108E of the IIoT module 100, which may be the email address the customer 85 assigns to the IIoT module 100 using the customer's email server 86. An example of the IIoT module's 100 email address may be "flow-rate-cooling-water-distillation-tower customer.com", using an email server 86 managed by the customer 85 with the domain name "customer.com". Alternately, the IIoT module 100 may use an online email service like Gmail or Yahoo Mail with a domain name "gmail.com". Still another alternative is an email to the customer 85 that is redirected by the customer's email server 86 to the IIoT module 100, for example by reading the subject line of the email. For example, an email from the vendor 80 intended for the IIoT module 100 with an address of "customer-asset-management customer.com" and a subject line of "Alert to flow-rate-cooling-water-distillation-tower", would be redirected by the customer's email server 86 to the IIoT module 100. The customer's data and the communications address 108B may also include the identity and address 108C of an employee of the customer 85 who is responsible for the instrument 90, and the location 108D of the instrument 90 when installed. The IIoT module 100 may receive at 97 the customer's data and the communications address 108B via the USB socket 105 and communications interface 102 and store the data in the RAM memory 125 as data and links 108. Alternately, the customer's data and the communications address 108B may be downloaded at 97' via the instrument communications interface 94 of the instrument 90 and transferred to the RAM memory 125 in the IIoT module 100. At any time, the customer 85 may update the customer's data in the RAM memory 125, updating the identity and address of an employee of the customer 85 who is responsible for the instrument 90, and updating the location 108D of the instrument 90.

FIG. 3C is an example functional block diagram of the IIoT module 100 of FIG. 3B connected over the Internet to the vendor, illustrating an example operation of code component 206, the IIoT module 100 transmitting the communications address 108E of the IIoT module 100 and the serial number 111 of the instrument to the vendor 80. The IIoT module 100 transmits the communications address to receive messages from the vendor 80 over the wide-area communications link or internet link. The IIoT module 100 may communicate with the vendor 80 of the instrument 90 over the wide-area communications link or internet link 82 using email messages 87, when the IIoT module 100 is located at the customer's 85 plant. Wide-area communications link alternatives to the Internet may include circuit-switched telephone lines, cellular telephone, radio-wave transmission, optical fiber, cable, and WiMAX. The IIoT module 100 may transmit the communications address 108E of the IIoT module 100 and the serial number 111 of the instrument to the vendor's email server 81 via the USB socket 105 and communications interface 102. Alternately, the communications address 108E of the IIoT module 100 and the serial number 111 of the instrument may be transmitted via the instrument communications interface 94 of the instrument 90 to the vendor's email server 81.

The IIoT module 100 may periodically monitor the operational health of the instrument 90 and transmit periodic reports via email messages 87 to the vendor's email server 81. Based on such periodic health reports, the vendor 80 may send an alert notice in an email to the IIoT module 100, comprising diagnostic, maintenance, update, recall or notification of non-conformance information pertaining to the instrument 90.

FIG. 3D is an example functional block diagram of the IIoT module of FIG. 3C connected over the Internet to the vendor, illustrating an example operation of code component 208, the IIoT module 100 receiving an email message 88 with the vendor's data and alert 108D. The vendor's data and alert 108D may include the instrument model number 110, the instrument serial number 111, and an alert notice 115. The vendor's data and alert 108D is sent from the vendor 80 to the email server 86 of the customer 85. The manufacturer or vendor 80 may determine that the instrument 90 may develop a safety related issue that requires issuing the alert notice pertaining to recall or non-conformance of the instrument 90. The instrument alert data 115 may include diagnostic, maintenance, update, recall or notification of non-conformance information pertaining to the instrument 90. The IIoT module 100 may receive the vendor's data and alert 108D from the customer's email server 86 of the customer 85 via the USB socket 105 and communications interface 102 and store the data in the RAM memory 125 as data and links 108. Alternately, the vendor's data and alert 108D may be downloaded via the instrument communications interface 94 of the instrument 90 and transferred to the RAM memory 125 in the IIoT module 100.

The vendor's database 83 may have records additional alerts 108D(2) and 108D(3) of many industrial customers that have one or more of the same instrument 90 in their plants. The vendor 80 will repeat broadcasting the alert notice in emails similar to the email 88 to other IIoT modules 100 based on each respective product identifier or serial number, to all other affected customers.

FIG. 3E is an example functional block diagram of the IIoT module of FIG. 3D, illustrating an example operation of code component 210, forwarding the vendor's data and alert 108D sent from the vendor 80 to the customer's email server 86 of the customer 85. The IIoT module 100 may transmit the vendor's data and alert 108D, for example via the Wi-Fi wireless radio 104 or the USB socket 105, to an employee 95 of the customer 85, who is responsible for the instrument 90. A copy of the vendor's data and alert 108D is transmitted by the IIoT module 100, for example via the Wi-Fi wireless radio 104 or the USB socket 105, to the customer's asset management entity 89, which may be an asset management department or an asset management service in the customer's 85 organization. Alternately, the vendor's data and alert 108D may be transmitted via the instrument communications interface 94 of the instrument 90 to the customer's asset management entity 89. The IIoT module 100 may also display the alert information and diagnostic, maintenance, or update information on the display device 93 of the instrument 90. The IIoT module 100 may also transmit the alert information to the communications address of the instrument 90, for example an address that the customer 85 has assigned to the instrument interface 94, the IIoT module 100 communicating either directly with the instrument interface 94 or alternately through the customer email server 86. The IIoT module 100 may transmit to the instrument 90, parameter updates, software updates, maintenance information, or other information in the alert information.

FIG. 4 is a flow diagram of the computer program code components 200 which, when executed by operation of the processor 109 in the IIoT module 100, perform operations of the IIoT module 100 to enable the module to receive broadcast alert notices from the vendor 80 over the Internet 82, pertaining to product issues of the instrument 90. The blocks of the flow diagram represent computer code components stored in the RAM memory 125 or ROM memory 127, which when executed by the processor 109, perform operations of the IIoT module 100. The blocks of the flow diagram may be executed in another order than shown and individual blocks may be combined or separated into component blocks. In some embodiments, one or more of the blocks may be optional.

The code components 200 in the RAM memory 125 in the IIoT module 100 include at least the following:

Code component 202: receiving, by a module, from a vendor of an instrument, an identifier of the instrument with which the module is associated and a communications address of the vendor over a wide-area communications link or internet link.

Code component 204: receiving, by the module, from a customer of the vendor, a communications address to receive messages from the vendor over the wide-area communications link or internet link, and a communications address of the customer or an associate of the customer having a responsibility for the instrument.

Code component 206: transmitting, by the module, over the wide-area communications link or internet link to the vendor, the identifier of the instrument and the communications address to receive messages from the vendor over the wide-area communications link or internet link.

Code component 208: receiving, by the module, from the vendor, an alert notice pertaining to the instrument, via the communications address to receive messages from the vendor over the wide-area communications link or internet link.

Code component 210: transmitting, by the module, to the communications address of the customer or the associate of the customer, information related to the alert notice pertaining to the instrument.

As such, embodiments described above provide for notification concerning recall or notification of non-conformance of an industrial instrument product. A module associated with the instrument communicates with the vendor of the instrument over a wide-area communications link or internet link. When the module receives an alert notice from the vendor pertaining to recall or non-conformance of the instrument, the module transmits the alert information to the customer or an associate of the customer having a responsibility for the instrument. The module may also cause the alert information and diagnostic, maintenance, or update information to be displayed on a display device of the instrument.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method for communicating instrument alert notices, comprising:
    receiving, by a processor mounted within an instrument or attached to the outside of an instrument, from a vendor of the instrument, an identifier of the instrument with which the processor is associated and a communications address of the vendor over a wide-area communications link or internet link, wherein the processor is coupled to a communications interface connecting the processor to the vendor of the instrument at a time of vending the instrument, and the processor is coupled to a memory including computer program code executable by the processor;
    receiving, by the processor, from a customer of the vendor, a communications receiving address to receive messages from the vendor over the wide-area communications link or internet link, the processor being connected by the communications interface to the customer of the vendor after delivery of the instrument including the processor to the customer, and the memory is configured to store the receiving address in the memory in the processor;
    transmitting, by the processor, via the communications interface, to the vendor, the identifier of the instrument and the communications receiving address to receive messages from the vendor over the wide-area communications link or internet link;
    receiving, by the processor, from the vendor, via the communications interface, an alert notice pertaining to the instrument, over the wide-area communications link or internet link; and
    transmitting, by the processor, via the communications interface, to the customer or an associate of the customer, information related to the alert notice pertaining to the instrument.

2. The method of claim 1, further comprising:
    receiving, by the processor, from the customer of the vendor, information related to a location of the instrument.

3. The method of claim 1, further comprising:
    transmitting, by the processor, over the wide-area communications link or internet link to the vendor, a communications address of at least one of the processor or the customer, to receive messages from the vendor over the wide-area communications link or internet link.

4. The method of claim 1, further comprising:
    transmitting, by the processor, over a wireless link to a communications address of the customer or the associate of the customer, information related to the alert notice pertaining to the instrument.

5. The method of claim 1, further comprising:
    transmitting, by the processor, via the communication interface, to an information display device of the instrument, information related to the alert notice pertaining to the instrument.

6. The method of claim 1, further comprising:
    receiving, by the processor, from the vendor, an alert notice comprising diagnostic, maintenance, update, recall or notification of non-conformance information pertaining to the instrument.

7. The method of claim 1, further comprising:
    receiving, by the processor, from the customer of the vendor, at least one of an update of the information related to a location of the instrument or an update of a communications address of the associate of the customer having a responsibility for the instrument.

8. An apparatus for communicating instrument alert notices, comprising:
   at least one processor;
   at least one memory including computer program code, wherein the computer program code, when executed by operation of the at least one processor, performs an operation comprising:
      receiving, by a processor mounted within an instrument or attached to the outside of an instrument, from a vendor of the instrument, an identifier of the instrument with which the processor is associated and a communications address of the vendor over a wide-area communications link or internet link, wherein the processor is coupled to a communications interface connecting the processor to the vendor of the instrument at a time of vending the instrument, and the processor is coupled to a memory including computer program code executable by the processor;
      receiving, by the processor, from a customer of the vendor, a communications receiving address to receive messages from the vendor over the wide-area communications link or internet link, the processor being connected by the communications interface to the customer of the vendor after delivery of the instrument including the processor to the customer, and the memory is configured to store the receiving address in the memory in the processor;
      transmitting, by the processor, via the communications interface, to the vendor, the identifier of the instrument and the communications receiving address to receive messages from the vendor over the wide-area communications link or internet link;
      receiving, by the processor, from the vendor, via the communications interface, an alert notice pertaining to the instrument, over the wide-area communications link or internet link; and
      transmitting, by the processor, via the communications interface, to the customer or an associate of the customer, information related to the alert notice pertaining to the instrument.

9. The apparatus of claim 8, wherein the computer program code, when executed by operation of the at least one processor, performs an operation further comprising:
   receiving, by the processor, from the customer of the vendor, information related to a location of the instrument.

10. The apparatus of claim 8, wherein the computer program code, when executed by operation of the at least one processor, performs an operation further comprising:
   transmitting, by the processor, over the wide-area communications link or internet link to the vendor, a communications address of at least one of the processor or the customer, to receive messages from the vendor over the wide-area communications link or internet link.

11. The apparatus of claim 8, wherein the computer program code, when executed by operation of the at least one processor, performs an operation further comprising:
   transmitting, by the processor, over a wireless link to a communications address of the customer or the associate of the customer, information related to the alert notice pertaining to the instrument.

12. The apparatus of claim 8, wherein the computer program code, when executed by operation of the at least one processor, performs an operation further comprising:
   transmitting, by the processor, via the communication interface, to an information display device of the instrument, information related to the alert notice pertaining to the instrument.

13. The apparatus of claim 8, wherein the computer program code, when executed by operation of the at least one processor, performs an operation further comprising:
   receiving from the vendor, an alert notice comprising diagnostic, maintenance, update, recall or notification of non-conformance information pertaining to the instrument.

14. The apparatus of claim 8, wherein the computer program code, when executed by operation of the at least one processor, performs an operation further comprising:
   receiving, by the processor, from the customer of the vendor, at least one of an update of the information related to a location of the instrument or an update of a communications address of the associate of the customer having a responsibility for the instrument.

15. A computer program product for communicating instrument alert notices, comprising computer executable program code recorded on a computer readable non-transitory storage medium, the computer executable program code comprising:
   code for receiving, by a processor mounted within an instrument or attached to the outside of an instrument, from a vendor of the instrument, an identifier of the instrument with which the processor is associated and a communications address of the vendor over a wide-area communications link or internet link, wherein the processor is coupled to a communications interface connecting the processor to the vendor of the instrument at a time of vending the instrument, and the processor is coupled to a memory including computer program code executable by the processor;
   code for receiving, by the processor, from a customer of the vendor, a communications receiving address to receive messages from the vendor over the wide-area communications link or internet link, the processor being connected by the communications interface to the customer of the vendor after delivery of the instrument including the processor to the customer, and the memory is configured to store the receiving address in the memory in the processor;
   code for transmitting, by the processor, via the communications interface, to the vendor, the identifier of the instrument and the communications receiving address to receive messages from the vendor over the wide-area communications link or internet link;
   code for receiving, by the processor, from the vendor, via the communications interface, an alert notice pertaining to the instrument, over the wide-area communications link or internet link; and
   code for transmitting, by the processor, via the communications interface, to the customer or an associate of the customer, information related to the alert notice pertaining to the instrument.

16. The computer program product of claim 15, further comprising:
   code for receiving, by the processor, from the customer of the vendor, information related to a location of the instrument.

17. The computer program product of claim 15, further comprising:

code for transmitting, by the processor, over the wide-area communications link or internet link to the vendor, a communications address of at least one of the processor or the customer, to receive messages from the vendor over the wide-area communications link or internet link.

18. The computer program product of claim 15, further comprising:
code for transmitting, by the processor, over a wireless link to a communications address of the customer or the associate of the customer, information related to the alert notice pertaining to the instrument.

19. The computer program product of claim 15, further comprising:
code for transmitting, by the processor, via the communication interface, to an information display device of the instrument, information related to the alert notice pertaining to the instrument.

20. The computer program product of claim 15, further comprising:
code for receiving, by the processor, from the vendor, an alert notice comprising diagnostic, maintenance, update, recall or notification of non-conformance information pertaining to the instrument.

21. A method for communicating instrument alert notices, comprising:
receiving, by a processor mounted within an instrument or attached to the outside of an instrument, from a vendor of the instrument, an identifier of the instrument with which the processor is associated and a communications address of the vendor over a wide-area communications link or internet link, wherein the processor is coupled to a communications interface connecting the processor to the vendor of the instrument at a time of vending the instrument, and the processor is coupled to a memory including computer program code executable by the processor;
receiving, by the processor, from a customer of the vendor, a communications receiving address to receive messages from the vendor over the wide-area communications link or internet link, the processor being connected by the communications interface to the customer of the vendor after delivery of the instrument including the processor to the customer, and the memory is configured to store the receiving address in the memory in the processor;
receiving, by the processor, from the vendor, via the communications interface, information representative of an alert notice pertaining to the instrument; and
transmitting, by the processor, via the communications interface, to the communications address of the instrument, the information representative of an alert notice pertaining to the instrument.

22. The method as recited in claim 21, further comprising:
displaying on an information display device of the instrument information related to the alert notice pertaining to the instrument.

23. The method as recited in claim 21, further comprising:
transmitting, by the processor, to the communications address of the instrument, parameter updates, software updates, maintenance information, or other information in the information representative of an alert notice pertaining to the instrument.

24. The method of claim 1, wherein the vendor is a custodian of the instrument and processor at the time that the processor is connected by the communications interface to the vendor and receives the identifier of the instrument with which the processor is associated and the communications address of the vendor; and
wherein the instrument and processor are located at the customer's location after delivery of the instrument including the processor to the customer and is connected by the communications interface to the customer to receive the communications receiving address of the instrument to receive messages from the vendor.

\* \* \* \* \*